(12) United States Patent
Evans et al.

(10) Patent No.: US 6,370,855 B1
(45) Date of Patent: Apr. 16, 2002

(54) GRASS BLOWER FOR LAWN MOWER

(75) Inventors: Arthur Leon Evans; Brad E. Church, both of Putnam County; David L. Shafer, Hendricks County; Duane R. Summerlot, Putnam County, all of IN (US)

(73) Assignee: Magic Circle Corporation, Coatesville, IN (US)

( * ) Notice: Subject to any disclaimer, the term of this patent is extended or adjusted under 35 U.S.C. 154(b) by 2 days.

(21) Appl. No.: 09/642,232

(22) Filed: Aug. 21, 2000

(51) Int. Cl.[7] ............................................... A01D 87/10
(52) U.S. Cl. .................. 56/320.2; 56/16.6; 56/16.8; 56/13.3
(58) Field of Search ................. 56/14.7, 16.7, 56/16.8, 16.9, 320.2, DIG. 5, 16.6, 13.3

(56) References Cited

U.S. PATENT DOCUMENTS

| | | | | |
|---|---|---|---|---|
| 4,426,830 A | * | 1/1984 | Tackett ...................... | 56/320.2 |
| 4,945,716 A | * | 8/1990 | Murakawa et al. .......... | 56/13.3 |
| 4,996,829 A | * | 3/1991 | Saitoh et al. ................ | 56/16.6 |
| 5,189,868 A | * | 3/1993 | Hill ............................. | 56/16.6 |
| 5,224,327 A | * | 7/1993 | Minoura et al. ............. | 56/16.6 |
| 5,245,817 A | * | 9/1993 | Hohnl ......................... | 56/16.6 |
| 5,826,416 A | * | 10/1998 | Sugden et al. ............. | 56/320.2 |
| 5,870,889 A | * | 2/1999 | Togoshi et al. ............ | 56/320.2 |

FOREIGN PATENT DOCUMENTS

| | | | |
|---|---|---|---|
| JP | 5152225 | * | 1/1993 |
| JP | 5284836 | * | 11/1993 |

\* cited by examiner

Primary Examiner—Robert E. Pezzuto
Assistant Examiner—Nathan Mammen
(74) Attorney, Agent, or Firm—Jack Schuman

(57) ABSTRACT

Grass blower for use with lawn mower, comprising rotating blade assembly in housing. Housing receives grass cuttings discharged from deck of lawn mower. Rotating blade assembly blows grass cuttings in housing into entrance of discharge chute.

2 Claims, 4 Drawing Sheets

GRASS BLOWER FOR LAWN MOWER

BACKGROUND OF THE INVENTION

1. Field of the Invention

This invention relates, broadly speaking, to an improved grass blower for lawn mowers.

More particularly, this invention relates to an improved grass blower for use with operating lawn mowers, which grass blower receive grass cuttings from said lawn mower and blows or impels said grass cuttings into a discharge chute.

2. Description of the Prior Art

Various means are known and used for receiving grass cuttings from an operating lawn mower and for blowing or impelling said grass cuttings into a discharge chute.

However, these conventional means need improvement, particularly in the efficiency of discharging said grass cuttings into a discharge chute, and in ease of construction.

SUMMARY OF THE INVENTION

One of the objects of this invention is to provide an improved grass blower for use with a lawn mower.

Another of the objects of this invention is to provide the grass blower for the aforesaid purposes, of high efficiency and ease of construction.

Still other and further objects of this invention will become apparent by reference to the accompanying specification and drawings, and to the appended claims.

The foregoing objects are attained by providing a grass blower comprising a rotary blower unit mounted to a rotor plate driven by the engine powering the lawn mower to which the grass blower is mounted.

The blower unit comprises pairs of transversely spaced blades which blow or impel grass cuttings received by grass blower from the lawn mower into the entrance end of a discharge chute.

DESCRIPTION OF THE DRAWINGS

Referring now to the drawings, in which like numerals represent like parts in the several views.

DESCRIPTION OF THE PREFERRED EMBODIMENT

Figure 5:
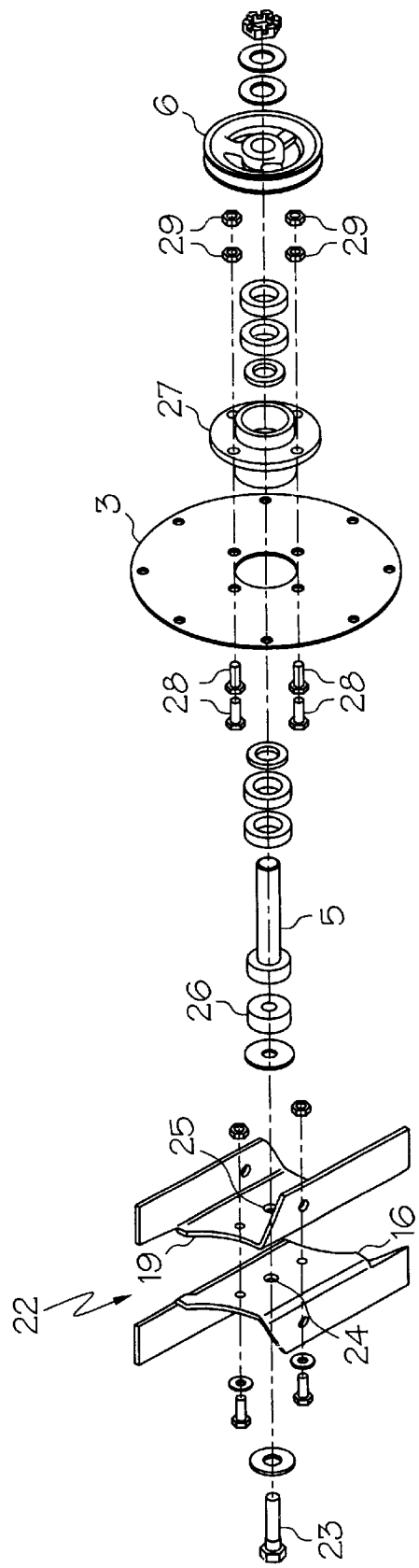
FIG. 5 represents in perspective an exploded view of the assembly of the blower unit, rotor plate and drive pulley.

Grass blower 1 comprises rotor blade assembly 2 and rotor plate 3 mounted within housing 4, the details of which assembly are shown in FIG. 5.

Rotor plate 3 is secured to shaft 5, one end of which extends out of one side of housing 4. Drive pulley 6 is secured to that end of shaft 5 extending out of housing 4.

Housing 4 is mounted to deck 7 of a lawn mower. The discharge opening of deck 7 abuts an opening (not shown) in that side of housing 4 through which shaft 5 does not extend. In this manner, grass cuttings generated in deck 7 by the rotating cutting blades therein enter housing 4 through the said opening.

Pulley 8 positioned on deck 7 is secured to shaft 9 extending into the interior of deck 7 to a pulley (not shown) within the said deck 7 and driven by a conventional belt system operated by the engine driving the lawn mower. In this manner, pulley 8 is rotated in the direction indicated by arrow 10, thereby to drive belt 11 around intermediate pulleys 12 and 13 and around drive pulley 6, causing drive pulley 6 to rotate in the direction indicated by arrow 14.

Because drive pulley 6 is secured to shaft 5 at one end thereof, and because rotor plate 3 is secured to shaft 5, the said rotor plate 3 will rotate in the direction indicated by arrow 15.

Figure 1:
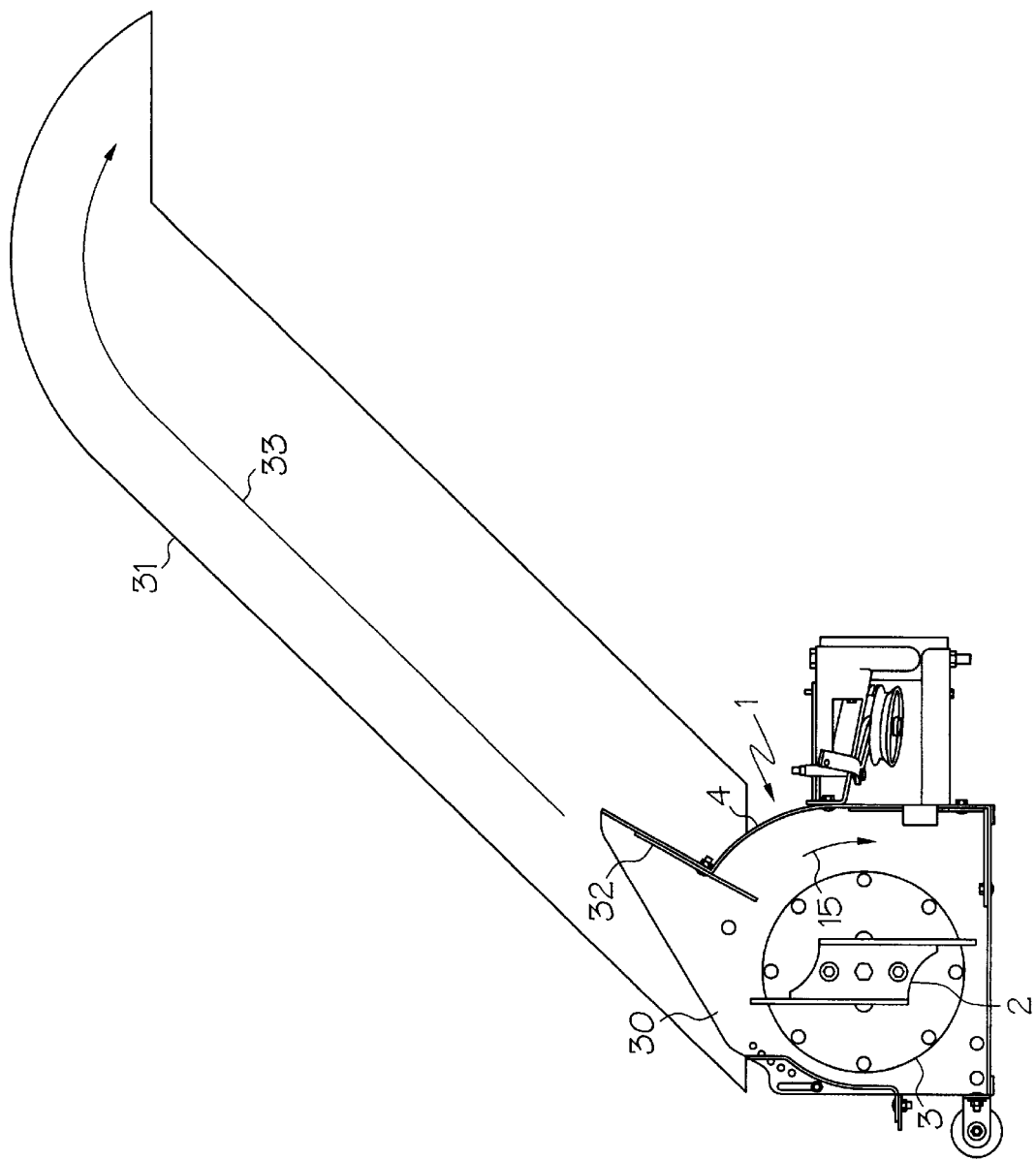
FIG. 1 represents a section in elevation showing the grass blower of the present invention and the discharge chute which receives grass cuttings blown or impelled into it by the grass blower.
Figure 2:
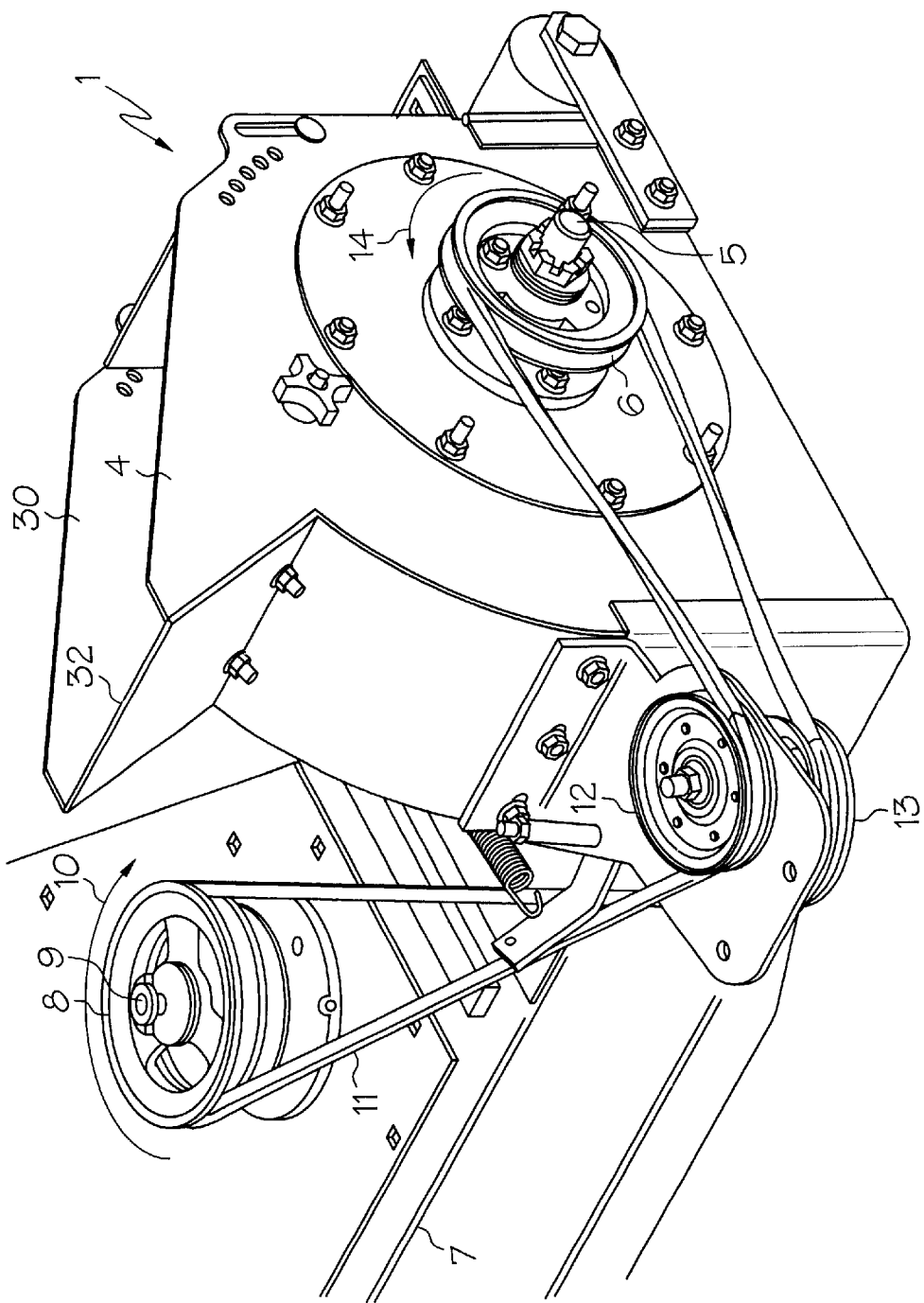
FIG. 2 represents a view in perspective of the grass blower and the adjacent portion of the deck of a lawn mower.
Figure 4:
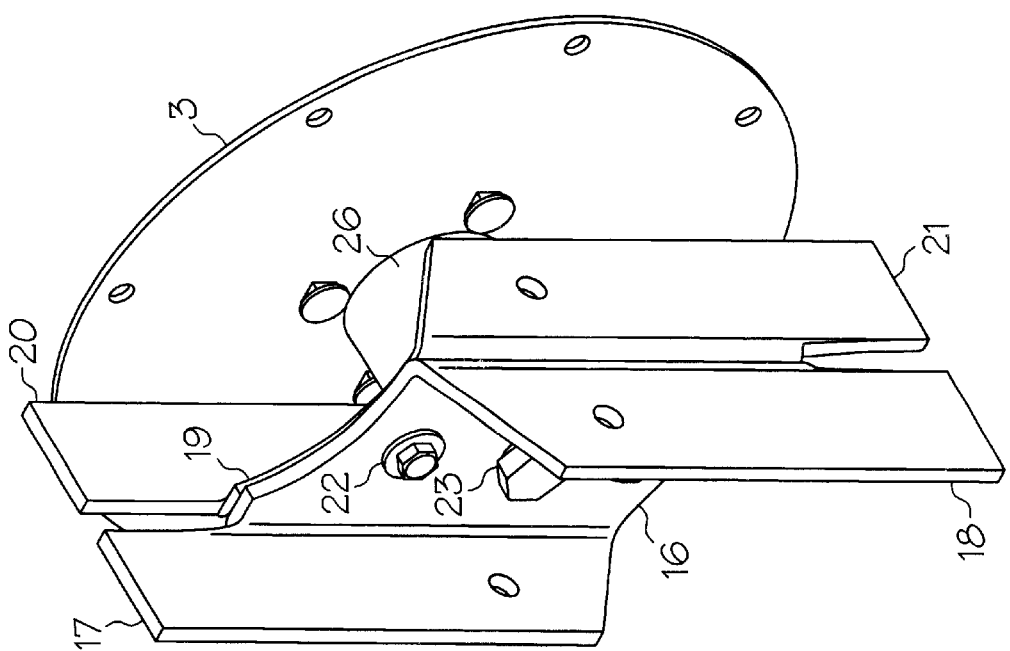
FIG. 4 represents an enlarged view in perspective of the blower unit.
Figure 3:
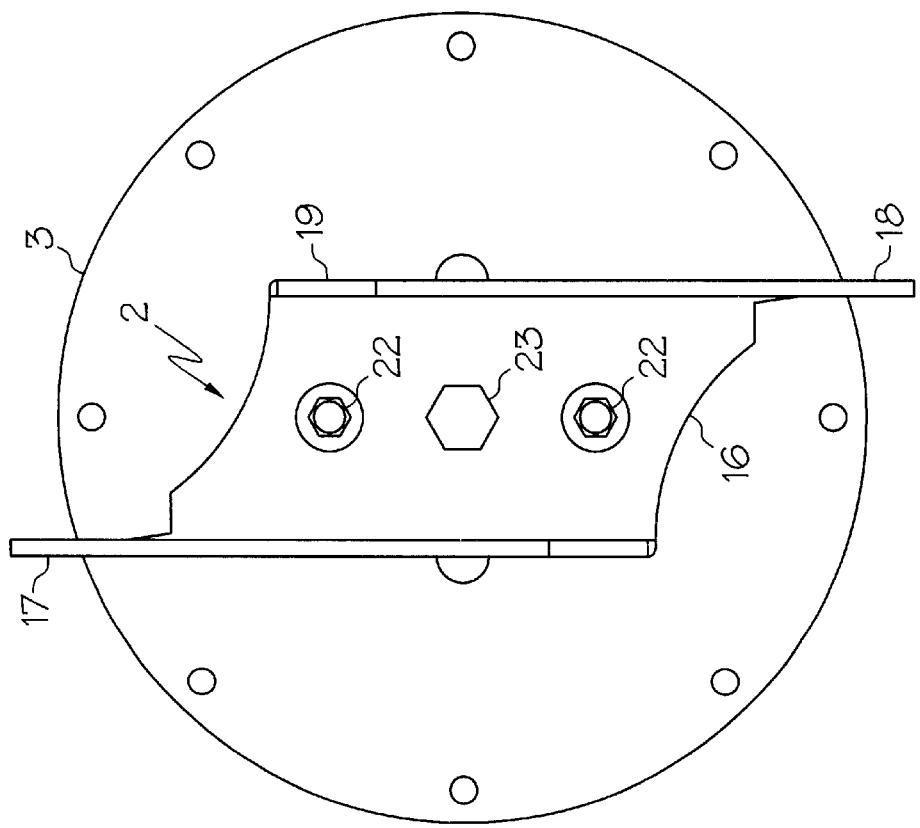
FIG. 3 represents an enlarged view in side elevation of the blower unit.

Turning now to FIGS. 3 and 4, it will be seen that rotor blade assembly 2 comprises web 16 with flanges constituting blower blades 17 and 18, and web 19 with flanges constituting blower blades 20 and 21. Rotor blade assembly 2 is balanced around shaft 5, and the areas of blower blades 17, 18, 20 and 21 are equal.

Webs 16 and 19 are held together by means of bolts 22 in such manner that blower blades 17 and 18 are adjacent each other as shown, and that blower blades 18 and 21 likewise are adjacent each other as shown.

As shown in greater detail in FIG. 5, bolt 23 extends through central openings 24 and 25 in webs 16 and 19 and through spacer 26, and is securely threaded into threaded aperture in one end of shaft 5.

Shaft 5 extends through rotor plate 3, center drive hub 27 to which said shaft 5 is secured, out through one side of housing 4, and into drive pulley 6 to which the said shaft 5 is secured, as aforesaid. Bolts 28 and nuts 29 secure the rotor plate 3 to center drive hub 27. In this manner, rotation of drive pulley 6 rotates shaft 5 and causes rotation of center hub drive 27 and thus of rotor plate 3 secured thereto. Rotation of rotor plate 3 results in rotation of rotor blade assembly 2 secured thereto.

The other elements of the exploded view of FIG. 5, unnumbered, are readily recognizable washers, etc. Blower housing 4 is provided with discharge opening 30 communicating with the entrance end of discharge chute 31. Inclined plate 32, mounted to blower housing 4 and extending partially into blower housing 4 at one edge thereof and into discharge chute 31 at the other end thereof, assists in the propulsion of grass cuttings into discharge chute 31 and prevents the return into blower housing 4 of grass cuttings blown upwardly by the rotor blade assembly 2. The direction of travel of grass cuttings into and out of discharge chute 31 is indicated by arrow 33.

In operation, grass cuttings generated by the lawn mower in the deck 7 pass from the deck 7 into blower housing 4 and are blown by rotating rotor blade assembly 2 out of blower housing 4 into the entrance end of discharge chute 31, all in a most efficient manner.

Since modifications and changes which do not depart from the spirit of the invention as disclosed herein may readily occur to those skilled in the art to which this invention pertains, the appended claims should be construed as covering all suitable modifications and equivalents.

We claim:

1. A grass blower adapted to receive grass cuttings from the deck of an operating lawn mower and blow said grass cuttings into the entrance end of a discharge chute, said grass blower comprising:

(a) a housing adapted to receive grass cuttings discharged from the deck of an operating lawn mower,
(b) a blade assembly mounted for rotation in said housing, said blade assembly comprising:
  (i) a first web,
  (ii) a first blade mounted to one side of said first web,
  (iii) a second blade mounted to the opposite side of said first web,
  (iv) a second web,
  (v) a third blade mounted to one side of said second web,
  (vi) a fourth blade mounted to the opposite side of said second web,
  (vii) said first, second, third and fourth blades being substantially equal in area and weight,
  (viii) means securing said first and second webs together with said first and third blades being adjacent each other and with said second and fourth blades being adjacent each other,
  (ix) a central aperture extending through the centers of said first and second webs,
  (x) a shaft extending through said central aperture,
  (xi) whereby said first and second webs are balanced about said shaft,
  (xii) securement means operatively securing said first and second webs to said shaft,
(c) drive means to rotate said shaft,
(d) a discharge opening in said housing adapted to communicate with the entrance end of a discharge chute,
(e) whereby rotation of said blade assembly about said axis causes said first, second, third and fourth blades to blow grass cuttings in said housing into the entrance end of said discharge chute.

2. Apparatus as in claim 1, further comprising:
(f) an inclined plate mounted to said housing adjacent said discharge opening, one edge of said inclined plate extending partially into said housing, the opposite edge of said plate extending into said discharge chute,
(g) whereby said inclined plate prevents grass cuttings blown upwardly by said blade assembly from falling back into said housing.

* * * * *